United States Patent
Soderberg et al.

[11] Patent Number: 5,720,322
[45] Date of Patent: Feb. 24, 1998

[54] CHAFER FABRIC WITH TEXTURED NYLON WARP YARNS

[75] Inventors: Roger H. Soderberg; Michael J. Chekan, both of LaGrange, Ga.

[73] Assignee: Milliken Research Corporation, Spartanburg, S.C.

[21] Appl. No.: 661,389

[22] Filed: Jun. 11, 1996

Related U.S. Application Data

[62] Division of Ser. No. 511,595, Aug. 4, 1995, Pat. No. 5,609,701.

[51] Int. Cl.$^6$ .................................................. D03D 15/00
[52] U.S. Cl. .............................. 139/420 A; 139/383 R; 139/426 R; 152/DIG. 14; 442/189
[58] Field of Search ..................... 152/543, DIG. 14; 139/383 R, 420 A, 426 R; 428/229; 442/189

[56] References Cited

U.S. PATENT DOCUMENTS

| | | |
|---|---|---|
| 2,934,126 | 4/1960 | Wilson. |
| 2,947,340 | 8/1960 | French. |
| 3,040,797 | 6/1962 | Saint Paul. |
| 3,902,536 | 9/1975 | Schmidt. |
| 3,939,893 | 2/1976 | Schmidt. |
| 4,107,371 | 8/1978 | Dean. |
| 4,196,763 | 4/1980 | Imamura ........................ 139/426 R |
| 5,342,678 | 8/1994 | Ingus ............................. 139/426 R |
| 5,365,988 | 11/1994 | Soderberg et al.. |
| 5,609,701 | 3/1997 | Soderberg et al. ................. 152/543 |

*Primary Examiner*—Andy Falik
*Attorney, Agent, or Firm*—Terry T. Moyer; Earle R. Marden

[57] ABSTRACT

A wick proof woven chafer fabric for automotive radial tires having a monofilament fill yarn and a large denier textured multifilament warp yarn. The texturing of the warp yarns allows for efficient wickproofing of the fabric and the larger denier, higher tensile strength warp, provides a fabric which enables efficient calendering.

1 Claim, 2 Drawing Sheets

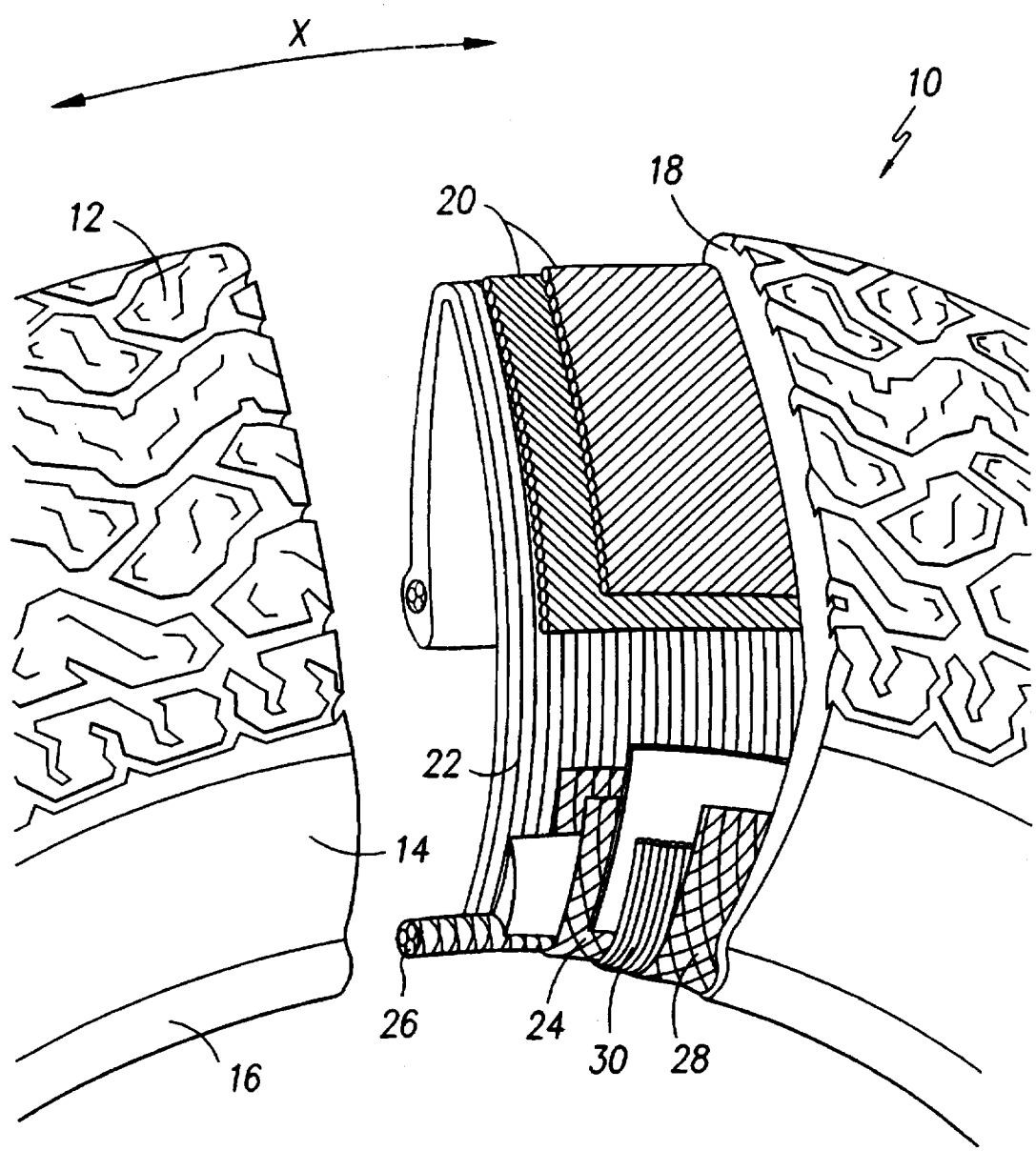
FIG. -1-

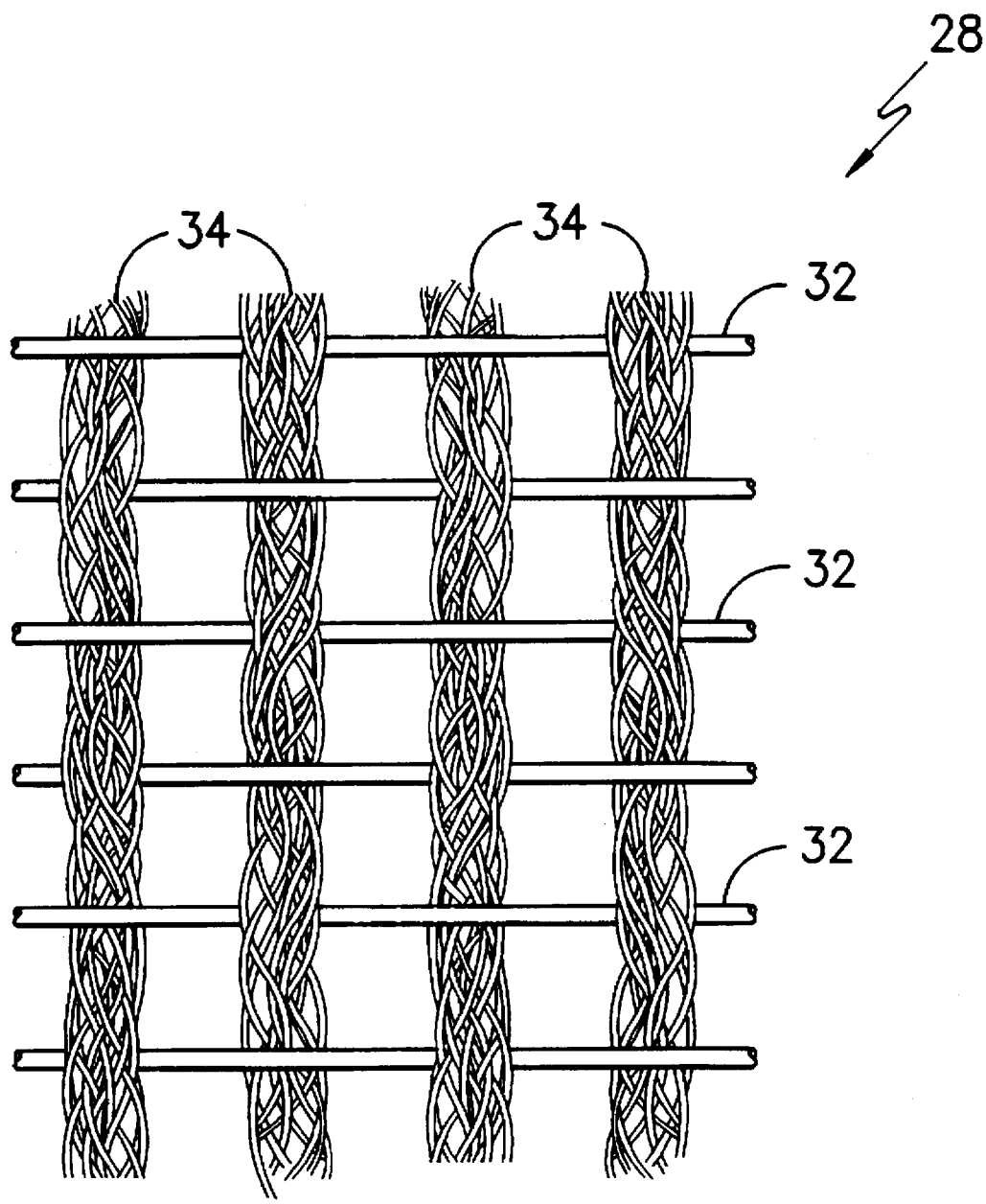
FIG. -2-

CHAFER FABRIC WITH TEXTURED NYLON WARP YARNS

This is a division of patent application No. 08/511,595, filed on Aug. 4, 1995 for IMPROVED CHAFER FABRIC U.S. Pat. No. 5,609,701. Specific reference is being made herein to obtain the benefit of its earlier filing date.

This invention relates general to pneumatic radial tires and more specifically to chafer fabric for such tires to prevent abrasion of the tire with the wheel rim flanges when mounting and dismounting such tires.

Automotive tires as traditionally constructed employ as a carcass a polymeric material, such as rubber, reinforced with textile cords and steel belts. The wheel engaging portion of the tire is further reinforced by circumferentially extending cores of wire or other relatively rigid material known as "beads". Extending at least partially about these beads and on their surface are "chafer strips" which are intended to resist abrasion of the tire by the rim flanges when the tire is mounted and dismounted.

Chafer fabric is conventionally prepared by flat weaving a fabric, wick-proofing and then friction calendering green rubber to both faces of the flat woven fabric and then bias cutting and slitting the calendered fabric into strips of from 1 to 5 inches in width. The step of friction calendering green rubber to the woven fabric and/or skim calendering is carried out to facilitate the ease of bias cutting and piece lay up in green tire building, as well as promoting the vulcanization of the components making up the tire body in the final product.

It should be understood that the chafer fabric of this invention is a woven chafer fabric, that is to say a fabric having substantially straight warp and filling threads interlaced at substantially right angles. A woven fabric should not be confused with a braided or plaited fabric wherein individual threads are skewed and are intertwined at acute angles with each other. Plaited fabrics are not useful as chafer fabrics due to a lack of dimensional stability of the fabric structure.

It is therefore an object of the invention to provide a chafer fabric for tires which can be readily wick-proofed, calendered and molded.

Historically chafer fabrics have been produced out of cotton, but with the advent of the tubeless tire, the yarns in the chafer fabric had to prevent the high pressure air inside the tire from wicking (bleeding) along inside the yarn bundles and reaching outside the rim. If the air can reach the outside tire surface, the tire will slowly lose pressure and gradually go flat. Therefore a wick-proof fabric is essential in the preparation of tires of the tubeless type, and especially high pressure tubeless tires.

For purposes of this invention, the term "wick-proofing" may be defined as a process wherein each cord of a fabric sheet is made impervious to the passage of air. In tubeless tires, high air pressure in the air cavity pushes against the inner surface, and significantly at the bead area, and if the fabric in the chafer is not impervious to the passage of air, air will penetrate the individual cords which then serve as conduits to wick air into the tire body causing blistering and delamination of rubber or leading to the outside atmosphere thereby reducing the internal load supporting air pressure of the tire with undesirable results. Any of a wide variety of wick-proofing processes are satisfactory for use in conjunction with this invention, such as, for instance, wick-proofing processes of the type set forth in U.S. Pat. No. 2,978,784.

In conjunction with tubeless tires, rayon, nylon, and polyester continuous filament yarns became available, and these fibers required an adhesive finish which would adhere to the rubber of the tire. With multifilament yarns bundles this finish (generally referred to as KFL) can penetrate to the core of the yarn bundles (if proper procedures are followed) and block the passage of air. Monofilament yarns, typically nylon, are wick-proof by their nature, and only a small amount of RFL adhesive is needed for adhesion to the rubber.

Monofilament yarns (typically T-6 or T-66 nylon) are widely used around the world because of the guaranteed wick-proof characteristic. However, the monofilament yarn size must be kept small (380–440 denier) to keep it flexible, and therefore it is weak in tensile strength. For the woven fabric to be strong enough to withstand the tension applied during the tire industry's rubber calendering process, the warp construction must be kept relatively high, typically 22–25 ends/inch. Since chafer fabrics are generally used after being cut on the bias, the pick count is typically the same as the warp end count, 22–25.

The use of higher tensile, larger denier multifilament yarns ranging in size from 840–1260 denier, with the most common sizes being 840 and 1000 denier, is possible due to the flexibility provided by the many finer filaments these larger yarn bundles are comprised of. These yarns are either twisted or textured for processability through the textile manufacturing processes. Due to the higher strength, constructions in the range of 12 ends and picks to as high as 18 ends and picks are used. An inherent need of these multifilament yarns is to be impregnated to the core of the yarn bundle with RFL to make them wick-proof. To reliably accomplish this, dip pick-up levels range from 14% to as high as 35%. Monofilament yarn dip pickup, on the other hand, ranges from 3% to 9% which only has to impart satisfactory adhesion-not wick-proofness.

It is another objective of this invention to combine multifilament and monofilament yarns in one chafer fabric to optimize utilization of their physical properties while incurring minimum cost in the fabric. By using multifilament yarn in the warp, either twisted or textured, and monofilament in the filling, warp tensile strength can be maintained at an adequate minimum level, 160 lb./in. (grab method) while using a low end count (12–18 ends/in.). Since filling direction tensile is not critical to processing or performance in the tire, the monofilament yarn can be used in this direction at a possible range of 12–18 picks/in. The dip pick-up in the warp will provide the wick-proof property while still allowing the multifilament yarns remain flexible. The monofilament filling will only pick up enough RFL to provide adhesion, and the lower denier and low pick count will maintain filling direction flexibility.

Other objects and advantages of the invention will become clearly apparent as the specification proceeds to describe the invention with reference to the accompanying drawings, in which:

FIG. 1 is a schematic of a conventional automotive tire showing the relationship of the various components of the tire; and FIG. 2 is a plan view of the new and improved chafer fabric used in the tire shown in FIG. 1.

Looking now to FIG. 1 a typical tire construction is shown in schematic fashion.

Basically the tire 10 consists of three sections, the tread area 12, the sidewall/shoulder area 14, and the bead area 16. The tread area 12 is composed of primarily of the tread cap 18, which is directly over the steel belts 20, which are centered on the upper surface of the tire cord fabric ply 22. The sidewall/shoulder area consists primarily of the tire cord fabric 22, additional rubber strips and the upper portions of the turned up flipper 24 and chafer strips 28. The bead area consists primarily of the bead wire 26, the flipper 24, the chafer 28, and the tire cord fabric turn up 30.

As briefly discussed before, the chafer fabric 28 is a rubber impregnated fabric, in the form of bias cut strips, which is applied to the bead area 16 of the tire in green tire construction. Originally the chafer strip was employed to reduce the chafing effect between the tire and the tire rim and to protect the plies underneath as well as aiding in producing bead shape and firmness in the bead area. In tubeless tires it provides the further function of preventing pressurized air from diffusing through the chafer yarns into the side wall or to the atmosphere causing sidewall blisters and the tire failure, or a flat tire. Therefore, these chafer yarns must be wickproof.

For use as chafer fabric, it is desired to employ a woven fabric which has a low end count. To this end, the chafer fabric 28, as represented in FIG. 2, is a standard woven fabric having a monofilament synthetic fill yarn 32 and a multifilament synthetic warp yarn 34. In the preferred form of the invention the fill yarn is a 420 denier monofilament nylon 6,6 yarn and the warp yarn is 900 denier textured nylon 6,6 multifilament yarn.

The above described chafer fabric 28 is a 14×14 plain weave but if desired, can be a balanced or unbalanced weave having 10–25 end per inch and 10–25 pick per inch with an RFL finish. The preferred multifil warp yarns are nylon 6,6 but other yarns such as nylon 6, polyester, rayon, etc can be employed. Nylon 6,6 nylon 6 or polyester can be used as the monofilament fill yarn. The warp yarn can be twisted or textured. The denier of the warp yarn can be in the range of 400–1400 denier and the fill yarn can be in the range of 200–720 defiler. The weight of the chafer fabric can vary from 2.0–5.4 oz/yd$^2$ and of any weave type such as plain, twill, basket, oxford, or satin weave.

While the above yarn selections and construction will optimize classic properties at lowest practical cost, there is another property that will be optimized. Chafer fabrics are typically open plain weave constructions so that rubber will flow through the interstices and imbed the fabric in the rubber at the surface of the bead area. Warp yarn generally stays straight and round in shape due to the warp direction tension constantly applied during weaving and RFL finishing. The filling yarns if multifilament (and particularly texturized) tend to flatten out, as there is little or no tension kept on them once the fabric is woven and during RFL application. As they flatten, they close up the interstices making them smaller and may even be plugged. These multifilament filling yarns, being soft and supple, also tend to shift causing a distorted and non-uniform weave. Monofilament yarns on the other hand maintain their cross-sectional shape and do not flatten out by their nature, and because of their inherent stiffness they stay straight and uniformly spaced across the fabric. The result of the above is larger and more uniform interstices than found in a standard 100% multifilament chafer.

Another potential benefit of this fabric design is the ability to produce a tucked filling selvage that is acceptable to the rubber industry. Currently the tucked selvage created by many modern weaving machines is too dense a construction for chafer if multifilament yarns are used. Current practice is to slit the selvage off after finishing. This is costly, creates a land fill problem, and reduces the selvages tear resistance. 100% Monofilament chafers with tucked selvages are becoming accepted, even at their higher pick count, because these smaller diameter yarns still allow rubber strike-through. By tucking monofilament filling at low pick count, the rubber strike-through is satisfactory even with the multifilament warp yarns. The resulting selvage is strong and processes well at the calender in the tire plant.

In summary, this invention combines the use of two forms of synthetic yarns in one chafer fabric to achieve the following:

1.) Optimum performance and processability of the chafer from the unique properties of each yarn.
2.) Optimum low cost due to utilization of yarn sizes to meet tensile requirements.
3.) Optimum low cost due to low RFL consumption by the monofilament yarn.
4.) Excellent weave quality due to the stiffer monofilament filling yarn.
5.) Superior strike-through due to the non-flattening monofilament filling and the tension rounded multifil warp.
6.) Superior selvage due to the tucked monofilament filling that still allows satisfactory rubber strike-through.
7.) Further cost reduction due to elimination of the selvage cutting process plus the retention of the selvage yarns in the usable body of the fabric.
8.) An environmental benefit in that the trimmed selvage material no longer is baled and hauled to the land fill.

Although I have described the preferred embodiment of my invention, I contemplate that many changes may be made without departing from the scope or spirit of my invention and I desire to be limited only by the claims.

What is claimed is:

1. A wickproof woven chafer fabric for automotive radial tires comprising: a plurality of nylon 6.6 420 denier monofilament fill yarns and a plurality of 900 denier, textured multifilament nylon 6.6 wrap yarn.

* * * * *